United States Patent [19]

Bowers

[11] Patent Number: 4,602,807
[45] Date of Patent: Jul. 29, 1986

[54] ROD COUPLING FOR OIL WELL SUCKER RODS AND THE LIKE

[76] Inventor: Rudy Bowers, 11384 Nayshon Ct., Cypress, Calif. 90630

[21] Appl. No.: 606,907

[22] Filed: May 4, 1984

[51] Int. Cl.⁴ .............................................. F16L 57/00
[52] U.S. Cl. ........................................ 285/45; 285/55; 285/332.4; 285/390; 285/417; 403/265; 403/266; 403/307; 403/343
[58] Field of Search ............... 285/45, 417, 55, 369, 285/334, 333, 390, 355; 166/242; 403/307, 343, 267, 265, 266, 269, 404

[56] References Cited

U.S. PATENT DOCUMENTS

| | | | |
|---|---|---|---|
| 319,144 | 6/1885 | Stephens et al. | 285/55 X |
| 1,134,092 | 4/1915 | Bahr | 285/369 X |
| 1,703,232 | 2/1929 | Gray et al. | 285/390 |
| 2,016,905 | 10/1935 | Nathan et al. | 285/45 X |
| 2,337,711 | 12/1943 | Crake | 285/355 |
| 2,646,822 | 7/1953 | Ferguson | 285/333 X |
| 2,656,857 | 10/1953 | Cavallier | 285/355 X |
| 2,690,934 | 10/1954 | Holcombe | 403/307 X |
| 2,739,018 | 3/1956 | Collett | 285/45 |
| 3,434,900 | 3/1969 | Bender | 285/45 X |
| 3,462,175 | 8/1969 | Johnson | 285/369 |
| 3,675,950 | 7/1972 | Beene | 285/355 X |
| 3,942,824 | 3/1976 | Sable | 285/333 |
| 4,205,926 | 6/1980 | Carlson | 403/266 |
| 4,226,550 | 10/1980 | Kupcak et al. | 403/267 X |
| 4,484,833 | 11/1984 | Gallagher, Jr. | 403/266 |

FOREIGN PATENT DOCUMENTS

| | | | |
|---|---|---|---|
| 916942 | 8/1954 | Fed. Rep. of Germany | 285/364 |
| 324499 | 4/1936 | Italy | 285/369 |

*Primary Examiner*—Cornelius J. Husar
*Assistant Examiner*—Douglas W. Hanson
*Attorney, Agent, or Firm*—Harris, Kern, Wallen & Tinsley

[57] ABSTRACT

A coupling for joining sucker rods in an oil well pump and the like, having a metal sleeve with an axially threaded bore and an exterior coating on the sleeve producing a cylindrical coupling, with the coating being an abrasive resistant thermoplastic hydrourethane polymer.

5 Claims, 2 Drawing Figures

ROD COUPLING FOR OIL WELL SUCKER RODS AND THE LIKE

BACKGROUND OF THE INVENTION

This invention relates to rod couplings, such as those used for pumping units in oil field production.

In a typical oil field, oil is pumped from the well by a pumping unit positioned at the surface. A typical pumping unit includes a motor driven reciprocating walking beam with one end positioned over the well and connected to a string of sucker rods in the bore by a bridle ring. There may be several thousand feet of sucker rods in the well, which rods are joined by sucker rod couplings.

The pumping string, comprising sucker rods and rod couplings, is reciprocated inside the well casing and since the couplings are of greater diameter than the rods, there is extensive abrasion of the couplings in the pumping operation. This rubbing between coupling and the inner surface of the casing also causes damage to the casing pipe.

Typical sucker rod couplings are formed of high quality steel with a cylindrical exterior and a central axial threaded bore. If desired, parallel wrench flats may be provided on the exterior for use in making up the sucker rod string.

It is an object of the present invention to provide a new and improved rod coupling which will have a substantially increased useful operating life in comparison with the conventional coupling now in use. A further object is to provide such a coupling which will substantially reduce the wear on the interior of the casing of a well.

It is a particular object of the invention to provide a rod coupling having the outer surface completely enclosed in a flexible abrasive resistant plastic coating, preferably a thermoplastic hydrourethane polymer.

These and other objects, advantages, features and results will more fully appear in the course of the following description.

SUMMARY OF THE INVENTION

A coupling for joining rods, such as those in a well pump, and comprising a metal sleeve having an axial threaded bore and an outer surface, and an exterior coating on the sleeve providing a substantially cylindrical coupling, with the coating in the form of a flexible abrasive resistant thermoplastic hydrourethane polymer formed on the sleeve by high pressure molding while in the molten state.

DESCRIPTION OF THE PREFERRED EMBODIMENT

Figure 1:
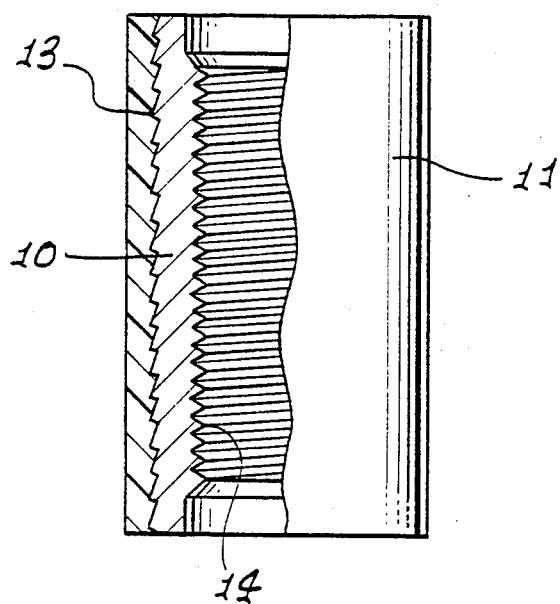
FIG. 1 is a side view of a rod coupling, partly in section, showing the presently preferred embodiment of the invention.

The sucker rod coupling of FIG. 1 comprises a steel sleeve 10 and a plastic coating 11. The sleeve 10 typically is cylindrical, but need not be, and preferably has an irregular outer surface 13 which may be produced by knurling or by chasing a helical thread on sleeve, or by a plurality of grooves. An axial threaded bore 14 receives the ends of adjacent sucker rods for coupling the rods together.

The plastic coating 11 is provided around the exterior of the sleeve, overlaying the outer surface 13. This coating is cylindrical or substantially cylindrical and preferably is in the range of about $\frac{1}{8}$ to $\frac{1}{4}$ inch thick. The plastic is a flexible abrasive resistant material, preferably a thermoplastic hydrourethane polymer which is molded under high pressure about the sleeve while in the molten state, as by injection molding. The material preferred is Lesley Products, Long Beach, Calif., R58810, a polyether-based extrusion compound. Characteristics of this material are set out in Table 1.

TABLE 1

| | ASTM | Sample* | Typical Values SI Units | Typical Values in-lb Units |
|---|---|---|---|---|
| Shore Hardness | D 2240 | 2 | 42 D | 42 D |
| Tensile Strength | D 412 | 1 | 38.2 MPa | 5550 psi |
| Tensile Stress @ 100% Elongation | D 412 | 1 | 9.0 MPa | 1300 psi |
| Tensile Stress @ 300% Elongation | D 412 | 1 | 17.2 MPa | 2500 psi |
| Ultimate Elongation | D 412 | 1 | 525% | 525% |
| Tensile Set @ 200% Elongation | D 412 | 1 | 25% | 25% |
| Vicat Softening Point | D 1525*** | 2 | 100° C. | 230° F. |
| Compression Set | D 395 | | | |
| 22 Hrs. @ 23° C. | | 2 | 25% | 25% |
| 22 Hrs. @ 70° C. | | 2 | 60% | 60% |
| Glass Transistion Temperature | DSC** | 3 | −44° C. | −47° F. |
| Tear Resistance | D 624 Die C | 2 | 74.4 kN/m | 425 lb/in |
| Tear Resistance | D 470 | 1 | 23.6 kN/m | 135 lb/in |
| Specific Gravity | D 792 | 2 | 1.13 | 1.13 |
| Low Temp. Stiffness | D 1053 | | | |
| Modulus of Rigidity @ 23° C. | | 2 | 11.1 MPa | 1609 psi |
| $T_2$ | | 2 | −7° C. | 19° F. |
| $T_5$ | | 2 | −20° C. | −4° F. |
| $T_{10}$ | | 2 | −26° C. | −15° F. |
| $T_{50}$ | | 2 | −52° C. | −62° F. |
| Freeze Point | | 2 | −40° C. | −40° F. |

*(1) 25 mil, extruded
(2) 75 mil, milled and pressed
(3) granules
**Differential Scanning Calorimeter, 10° C./min. temperature program
***Method B The plastic material may be clear or various coloring materials may be incorporated as desired.

Figure 2:
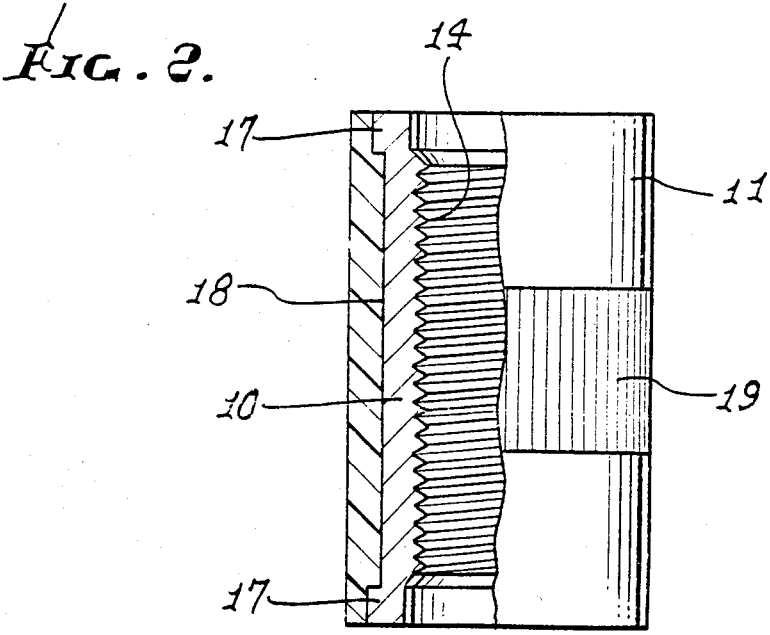
FIG. 2 is a similar view showing an alternative embodiment of the invention.

In the alternative embodiment of FIG. 2, the sleeve 10 has a rim 17 at each end, defining a recessed portion 18 on the outer surface between the rims. A tool gripping surface 19, typically a serrated surface, may be provided on the outer surface of the plastic coating if desired. The construction of the embodiment of FIG. 2 may otherwise be the same as that of FIG. 1.

With the prior art steel coupling, the coupling wall usually is abraded away with use, resulting in failure of the coupling. Such abrasion is eliminated or substantially reduced in the coupling of the present invention, and potential coupling failure is detected by inspection of the exposed metal ends for cracks. This inspection may be carried out whenever the string of rods is removed from the well.

I claim:

1. A coupling for joining solid reciprocating sucker rods to form a rod string in a well pump or the like comprising
    a unitary metal sleeve having an axial threaded bore and an irregular outer surface, and a homogeneous and non-fibrous coating on said sleeve over said outer surface providing an externally substantially cylindrical coupling, said coating comprising a flexible and abrasive resistant thermoplastic hydrourethane polymer formed on said irregular outer surface of said sleeve while in the molten state.

2. A coupling as defined in claim 1 wherein said metal leeve irregular outer surface is in the form of a helix.

3. A coupling as defined in claim 1 wherein said metal leeve irregular outer surface is in the form of a plurality of grooves.

4. A coupling as defined in claim 1 wherein said metal leeve irregular outer surface is in the form of rims at opposite ends of said sleeve with a recessed portion therebetween.

5. A well pump rod string for reciprocating in a well casing, including in combination:
   a plurality of solid sucker rods with externally threaded ends; and
   a plurality of coupling members with internal threads, with adjacent sucker rods joined by threading the adjacent ends thereof into a coupling member to provide the rod string;
   with each of the coupling members comprising an internally threaded unitary metal sleeve with an irregular outer surface, and
   a homogeneous and non-fibrous coating on said sleeve over the outer surface providing a substantially cylindrical coupling, with the coating comprising a flexible and abrasive resistant thermoplastic hydrourethane polymer formed on the sleeve while in the molten state.

* * * * *